United States Patent [19]
Catelli

[11] Patent Number: 5,415,732
[45] Date of Patent: May 16, 1995

[54] PROCESS AND APPARATUS FOR CONCENTRATING HIGH-VISCOSITY FOODSTUFFS

[75] Inventor: Camillo Catelli, Parma, Italy
[73] Assignee: Rossi & Catelli S.p.A., Parma, Italy
[21] Appl. No.: 834,330
[22] PCT Filed: Jul. 20, 1990
[86] PCT No.: PCT/EP90/01194
  § 371 Date: Apr. 7, 1992
  § 102(e) Date: Apr. 7, 1992
[87] PCT Pub. No.: WO91/01654
  PCT Pub. Date: Feb. 21, 1991

[30] Foreign Application Priority Data

Aug. 11, 1989 [IT] Italy ................... 21509 A/89

[51] Int. Cl.[6] ........................................... B01D 1/06
[52] U.S. Cl. .......................... 159/47.1; 159/26.1; 159/26.2; 159/27.1; 159/901; 426/520; 202/237
[58] Field of Search ............. 159/27.1, 27.4, 26.2, 159/28.1, 43.1, 901, 47.1, 26.1, 2.1; 202/237, 238; 426/520

[56] References Cited

U.S. PATENT DOCUMENTS

| | | | |
|---|---|---|---|
| 1,006,197 | 10/1911 | Frasch | 159/20.2 |
| 1,717,927 | 6/1929 | Hughes et al. | 202/237 |
| 2,519,618 | 8/1950 | Wilson et al. | 159/27.1 |
| 3,356,125 | 12/1967 | Standiford, Jr. | 159/20.2 |
| 3,521,605 | 7/1970 | Eckstrom et al. | 159/26.2 |
| 3,634,128 | 1/1972 | Bolin | 159/27.1 |
| 3,702,807 | 11/1972 | Newson et al. | 159/27.4 |
| 3,974,022 | 8/1976 | Lauro | 159/26.2 |
| 4,288,285 | 9/1981 | Houston | 159/27.4 |
| 4,334,962 | 6/1982 | Gerow | 202/205 |
| 4,683,025 | 7/1987 | Flores | 159/2.1 |
| 5,116,473 | 5/1992 | Bostjancic | 159/901 |

FOREIGN PATENT DOCUMENTS

| | | | |
|---|---|---|---|
| 0001752 | 11/1888 | United Kingdom | 159/27.1 |
| 0009499 | 4/1893 | United Kingdom | 159/26.2 |
| 0007154 | 3/1910 | United Kingdom | 159/27.1 |
| 1299891 | 12/1972 | United Kingdom | |

*Primary Examiner*—Virginia Manoharan
*Attorney, Agent, or Firm*—Sheridan, Ross & McIntosh

[57] ABSTRACT

A method and apparatus for concentration of a flowable foodstuff can be accomplished by supplying a flowable foodstuff into a vaporization chamber as split into a plurality of free nappes and causing the free nappes to run a predetermined distance to release vapor from their surfaces. After covering this distance, the free nappes of flowable foodstuff are collected into a mass at the bottom of the chamber.

9 Claims, 3 Drawing Sheets

PROCESS AND APPARATUS FOR CONCENTRATING HIGH-VISCOSITY FOODSTUFFS

This application is the United States National Phase of PCT/EP90/01194, filed Jul. 20, 1990.

DESCRIPTION

This invention relates to a method of concentrating high-viscosity flowable foodstuff, particularly but not solely useful to continuously concentrate tomato and fruit juices and pulps, generic pulped foodstuff, and the like flowable foodstuff products having a high viscosity and a fiber content which may be quite high.

The invention also concerns an apparatus for implementing this method.

The method and apparatus of this invention will solve in particular the problem of providing high concentrations of flowable foodstuff as outlined above, which concentrations usually associate with a high viscosity and low heat conductivity. In this respect, mention may be made to tomato juice concentration to yield concentrates.

For simplicity of expression and while excluding all and any limitations, flowable foodstuff products of the types mentioned above will be referred to hereinafter as "liquid mixtures" irrespective of their nature and stiffness, and the liquid to be evaporated as the "diluent".

In some prior arrangements, concentration has been carried out by boiling the liquid mixture to evaporate the diluent in vats heated by means of steam pipe coils or some other heating arrangements.

Such systems cannot afford high concentration and stiffness of the liquid mixture, due to difficulties with circulating and removing vapor from the concentrate, such difficulties appearing as the concentration and related viscosity of the liquid mixture increase.

In other prior arrangements, commonly termed downflow film systems and including a vertical tube nest heat exchanger, the liquid mixture flows down the individual tubes without completely filling them, that is, runs across their inner walls leaving their central portion unoccupied where vapor is released and then exhausted from one end of the tubes.

However, such prior systems are only effective to concentrate highly flowable liquid mixtures and unsuited to provide high concentrations, especially if the liquid mixture contains fibrous matter.

In yet another and more frequently employed arrangement, concentration is accomplished by heating the liquid mixture inside the tubes laid into a nest configuration.

With such systems, the liquid mixture effluent stream from each individual tube meet inside a header, wherein they mixed into a net stream which is then supplied to a separator, often of the cyclone type, wherein the vapor is released from the liquid mixture which, as a result, becomes concentrated.

Some of the mixture concentrate is tapped off to subsequent process steps, whereas the remainder is returned to the tube nest to undergo a further concentration cycle, and so forth.

It should be noted that the liquid mixture stream exiting each individual tube has a markedly higher surface temperature than either its core temperature or the substantially uniform temperature of the liquid mixture being supplied to the separator and resulting from the individual streams from the tube nest tubes being merged and mixed together.

In these prior systems, therefore, the vapor is separated from the liquid mixture based on the temperature of the net stream being fed into the separator, which temperature is, as mentioned, lower than the surface temperatures of the individual streams of liquid mixture issuing from the tube nest tubes.

It should be further noted that within the separator, even if of the usual cyclone type, the vapor should be released from the entire mass of liquid mixture, and therefore also from the remotest portions from the vaporization surface, thereby a higher temperature of the mixture becomes necessary to provide for difficult release of the vapor from the deepest layers thereof.

The method of this invention, particularly useful to concentrate a highly viscous flowable foodstuff (liquid mixture) which may contain fibrous matter, is of a type which consists of heating a continuous flow of said flowable foodstuff by causing it to flow, under a so-called full-tube condition, through a plurality of tubes of a tube nest heat exchanger, and is characterized in that it comprises the following steps:

- supplying said flowable foodstuff, from each tube in said heat exchanger directly into a vaporization chamber, to form a corresponding plurality of free nappes of heated flowable foodstuff therein;
- driving off said chamber the vapor being released from the surface of each free nappe of said flowable foodstuff;
- subsequently collecting all said free nappes of flowable foodstuff into a mass of concentrated flowable foodstuff, and
- returning said mass of concentrated flowable foodstuff to the inlet end of said heat exchanger following the addition of an appropriate amount of flowable foodstuff to be concentrated and tapping off concentrated liquid mixture.

Within the vaporization chamber, the vapor issues from the hotter peripheral layers of the individual free nappes, before said free nappes merge and mix together making the temperature uniform throughout.

The mass of concentrated mixture may collect at the bottom of the vaporization chamber, whence it would be picked up by means of a pump or such like devices and cycled back to the inlet end of the tube nest heat exchanger, after some of the concentrated liquid mixture is tapped off and a corresponding amount to be concentrated is added.

According to this method, vapor evolvement only takes place from the hotter surface layers of the individual free nappes without involving release of vapor from deep layers of any liquid masses, thus obviating the drawbacks that would be caused by resistances to such release.

In a preferred embodiment of the invention, a resistance to the mixture delivery is provided at the tube ends opening into the vaporization chamber, thereby the liquid mixture will be subjected, along the entire length of the heat exchanger tubes, to a higher pressure than in the vaporization chamber, and if necessary, also to the vapor pressure of the liquid mixture at the higher mixture temperature at the wall, thereby the liquid mixture is heated within the tubes of the heat exchanger without vaporization occurring at any point inside the tubes.

In this way, the thermal benefit is secured that the surface layers of the individual streams of liquid mixture inside the respective tubes of the heat exchanger are hotter than the core region of said streams, and that as the latter form the corresponding free nappes in the vaporization chamber, vaporization will take place from the hotter, external regions thereof. In particular when concentrating mixtures comprising food juices and pulps, the great advantage is secured that, with vaporization occurring nowhere inside the tubes, neither the product will be burned nor hard deposits formed across the tube walls.

In addition, since the vaporization surface is equal to the combined surfaces of the individual free nappes during their movement through the vaporization chamber before merging together into the mass of concentrated mixture, this vaporization surface will be much larger than that to be obtained with prior art methods.

It has been shown experimentally that the method of this invention can provide faster and deeper concentration of the liquid mixture, while reducing or even eliminating altogether the mixture overheating during the concentration step, thus contributing to the safeguard of the organoleptic properties of the start flowable foodstuff.

BRIEF DESCRIPTION OF THE DRAWINGS

The invention features and advantages will become more clearly apparent from the following detailed description of an embodiment of the inventive method, given with reference to the accompanying illustrative and non-limitative drawings, where.

Throughout the drawing figures, like component parts of the inventive apparatus are denoted by same reference numerals.

DESCRIPTION OF THE PREFERRED EMBODIMENT

Figure 1:
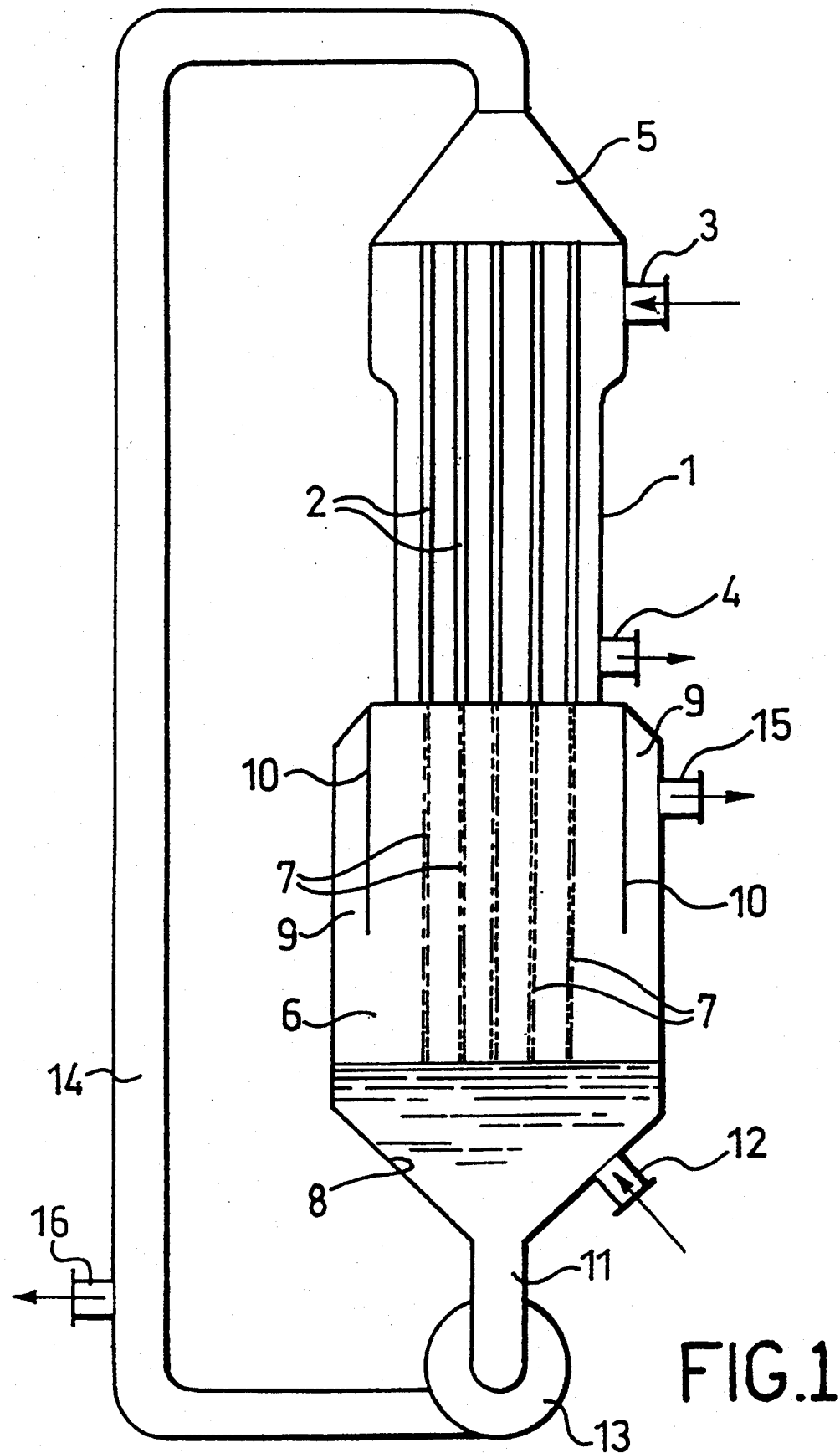
FIG. 1 shows schematically an apparatus for implementing a first embodiment of the method according to the invention.

With reference to FIG. 1, a vertical tube nest heat exchanger is shown at 1 wherein plural tubes 2 are communicated at the top with a chamber 5 arranged to receive a liquid mixture to be concentrated, and at the bottom with a vaporization chamber 6. The heat exchanger 1 is heated, such as by steam admitted through an inlet 3, condensation water be taken out through a drain 4.

The streams of liquid mixture are heated within the plural tubes 2 of the heat exchanger 1 and caused to fall into the vaporization chamber 6 to form a corresponding plurality of free nappes 7 therein. The term "free nappe" is used herein to indicate the peculiar configuration taken by each liquid stream flowing into and through the vaporization chamber without interfering with adjacent streams.

Said vaporization chamber 6 is provided sufficiently wide and long to allow the free nappes 7 issuing from the individual tubes 2 to flow down side-by-side without becoming mixed with one another.

Vapor evolves freely only from the surface layers of the individual nappes 7, which are hotter than the inner body (core) of the nappes.

A wall 10 is secured upwardly within the chamber 6, coaxially therewith, which defines, in cooperation with the inner surface of the chamber 6, an interspace 9 wherethrough the vapor evolving from the nappes 7 and flowing down into the chamber 6 along with them flows up to an outlet port 15.

The combination of the nappes 7 collect, after releasing the vapor, at the bottom 8 of the chamber 6 into a mass of concentrated liquid mixture. Through an inlet 12 in the bottom 8 of the chamber 6 a flow of liquid mixture to be concentrated is introduced which is additivated to the aforementioned concentrated liquid mixture in appropriate amounts.

Through pipes 11 and 14, a pump 13 returns the concentrated liquid mixture, as additivated of the liquid mixture to be concentrated, to the cycle, feeding it into the intake chamber 5 for the tubes 2.

From the stream cycled back, an amount of liquid mixture is taken out at 16 equal to the amount introduced at 12 less the amount of vapor removed at 15.

It stands to reason that the introduction of the liquid mixture to be concentrated and removal of the concentrated liquid mixture may also take place at different points; for instance, fresh liquid mixture could be introduced at 16, by providing suitable mixing means to make the napper uniform, and the concentrated liquid mixture be taken out at 12.

Figure 2:
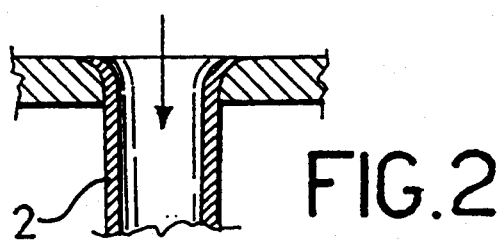

The embodiment of the invention provide for the top inlet mouths of the tubes 2 to be rounded off, as shown in FIG. 2, to reduce inlet losses and achieve a desired flow rate through the tubes more easily.

Figure 3:
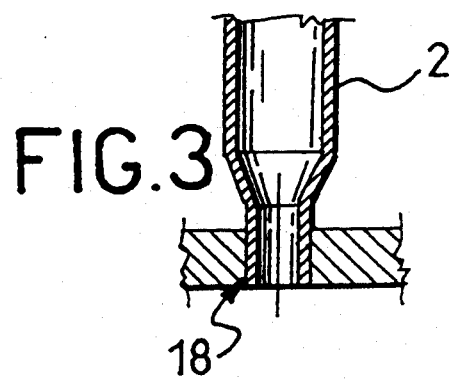

It is also contemplated that the tubes 2 may have the area of the outlet end 2a, open into the chamber 6, reduced as shown in FIG. 3, for example, in order to provide a back pressure in the terminating portion of the tube effective to prevent incipient vaporization therein, and consequent reduction of the transfer coefficients, and with hard deposit-forming liquid mixtures as food liquid mixtures are bound to be, also the formation of hard deposits and product burns.

This reduction in the cross-sectional inlet area may be obviously implemented in a variety of alternative ways: FIG. 3 shows a preferred solution wherein the outlet end section 18 of the tubes 2 is tapered by expanding them in holes of the outlet tube plate which have a smaller diameter than the tube diameter.

Figure 5:
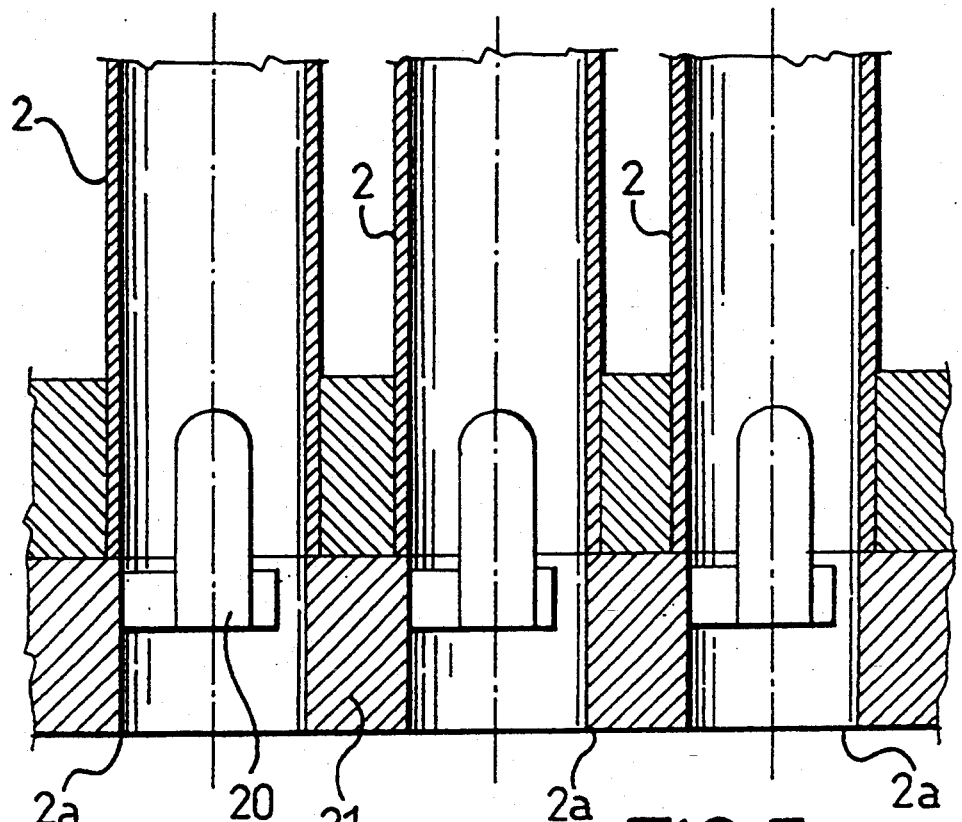
FIGS. 2 to 5 shows modified embodiments of a detail of the apparatus shown in FIG. 1.
Figure 4:
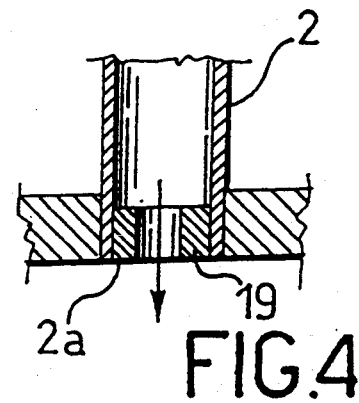

FIG. 4 shows a solution wherein a ring insert 19 is fitted into the outlet cross-section of the tube, such as by expanding or threading; FIG. 5 shows the solution based on the use of pins 20 carried on a holder 21 fitting into the outlet cross-section of the tube to reduce its area.

Figure 6:
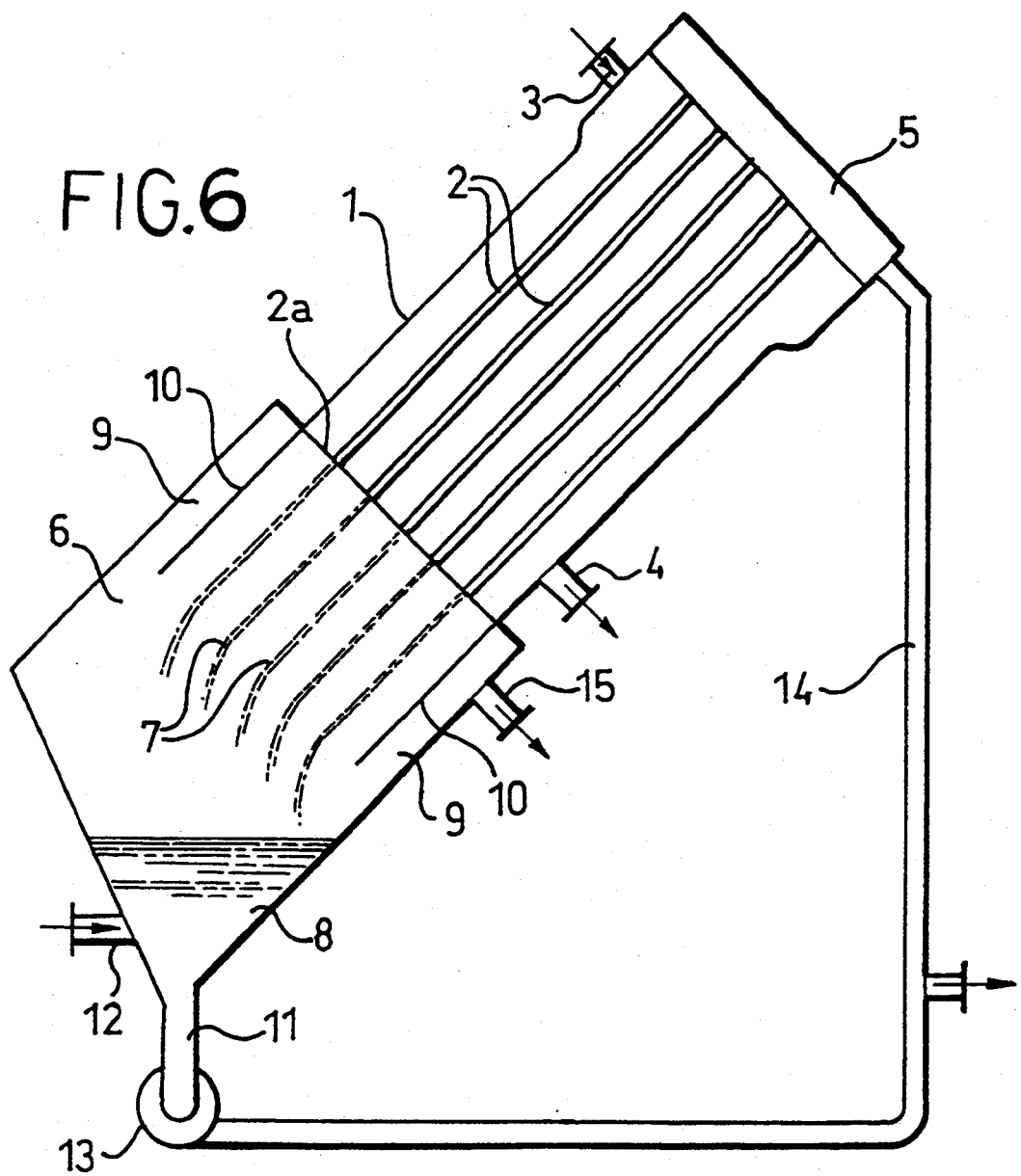
FIG. 6 shows schematically a modified embodiment of the apparatus shown in FIG. 1.
Figure 7:
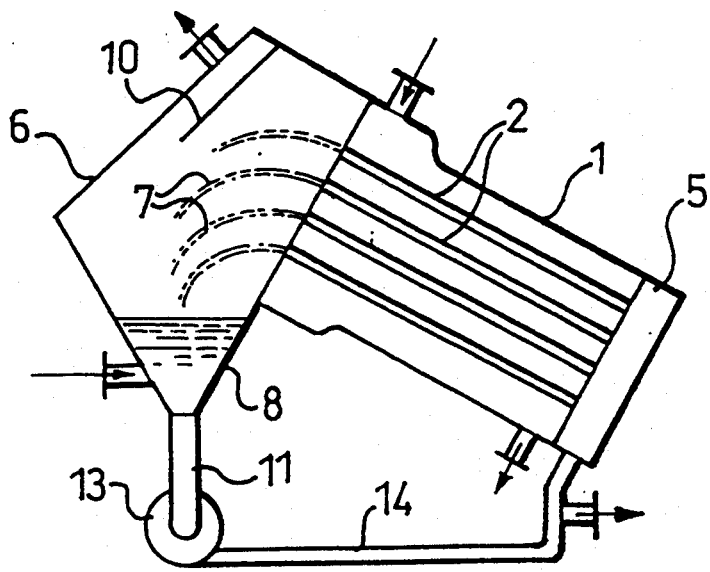
FIG. 7 shows schematically a further modified embodiment of the apparatus in Figure.

Throughout the various embodiments of the invention, it is further contemplated that the tubes 2, instead of being laid vertically downwards, as shown in FIG. 1, may extend in a sub-horizontal direction sloping downwards to a greater or lesser degree, as shown in FIG. 6 by way of example, and possibly sloping upwards to a greater or lesser degree, as shown in FIG. 7, but in all cases with the outlet to a vaporization chamber 6 located above the concentrated mass collected at the bottom 8 and wherethrough the free nappes issuing from the individual tubes can continue to flow without merging together over the required distance to evolve the vapor.

I claim:

1. A method of concentrating viscous flowable foodstuff containing fibers, which comprises the steps of:

heating a continuous flow of foodstuff by causing said foodstuff to flow through a plurality of heated tubes;

creating a back pressure in said plurality of heated tubes to prevent vaporization of said flowable foodstuff within said plurality of tubes, said creating step including obstructing the flow of said foodstuff through an outlet end of each of said plurality of heated tubes;

supplying said foodstuff from each of said plurality of heated tubes into a chamber to form a corresponding plurality of free nappes of heated foodstuff therein;

removing from said chamber the vapor being released from the surface of each said plurality of free nappes of heated foodstuff;

collecting all said plurality of free nappes of heated foodstuff into a mass of concentrated foodstuff;

adding fresh foodstuff to be concentrated;

tapping off a desired amount of said concentrated foodstuff; and returning said foodstuff to said plurality of heated tubes, said foodstuff including concentrated foodstuff.

2. An apparatus for concentrating a viscous flowable foodstuff containing fibers, comprising:

a heat exchanger having a plurality of tubes, wherethrough foodstuff is caused to flow, each of said plurality of tubes having an inlet end and an outlet end;

an obstruction means at said outlet end to create a back pressure to the flow of foodstuff to be concentrated to prevent vaporization of said foodstuff within said plurality of tubes;

a vaporization chamber, wherethrough corresponding free nappes of heated foodstuff flow, said chamber having a bottom, whereat a mass of said concentrated flowable foodstuff is collected;

at least one vapor-exhausting port, whereat vapor evolving from said free nappes is removed;

a recirculation pump having an inlet end connected to said bottom of said chamber; and an outlet end connected to said inlet end of said plurality of tubes.

3. An apparatus according to claim 2, wherein said obstruction means comprises a reduction in the area of said outlet end of each of said plurality of tubes by having each of said plurality of tubes socket tapered.

4. An apparatus according to claim 2, wherein said obstruction means comprises a ring insert.

5. An apparatus according to claim 2, wherein said obstruction means comprises a pin penetrating the outlet end of each of said plurality of tubes.

6. An apparatus according to claim 2, wherein said plurality of tubes are laid vertical and pass said foodstuff to be heated from the top downwards, said vaporization chamber being located beneath said heat exchanger.

7. An apparatus according to claim 2, wherein said plurality of tubes are laid horizontal or sloping downwards and open into said vaporization chamber at a distance above said bottom.

8. An apparatus according to claim 2, wherein said plurality of tubes are laid to slope upwards and pass said foodstuff from the bottom upwards into said vaporization chamber at a distance above said bottom.

9. An apparatus for concentrating viscous flowable foodstuff containing fibers, comprising:

means for heating a continuous flow of foodstuff by causing said foodstuff to flow through a plurality of heated tubes;

means for creating a back pressure in said plurality of heated tubes to prevent vaporization of said flowable foodstuff within said plurality of heated tubes, said creating step including obstructing the flow of said foodstuff through an outlet end of each of said plurality of heated tubes;

means for supplying said foodstuff from each said plurality of heated tubes into a chamber to form a corresponding plurality of free nappes of heated foodstuff therein;

means for removing from said chamber the vapor being released from the surface of each said plurality of free nappes of heated foodstuff;

means for collecting all said plurality of free nappes of heated foodstuff into a mass of concentrated foodstuff;

means for adding fresh foodstuff to be concentrated;

means for tapping off a desired amount of said concentrated foodstuff; and means for returning said foodstuff to said plurality of heated tubes, said foodstuff including concentrated foodstuff.

* * * * *